(12) United States Patent
Jian et al.

(10) Patent No.: US 10,297,915 B2
(45) Date of Patent: May 21, 2019

(54) APPARATUS AND METHODS FOR BEAMFORMING TRACKING

(71) Applicants: Ming Jian, Kanata (CA); Taiwen Tang, Nepean (CA); Wenyao Zhai, Kanata (CA)

(72) Inventors: Ming Jian, Kanata (CA); Taiwen Tang, Nepean (CA); Wenyao Zhai, Kanata (CA)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 300 days.

(21) Appl. No.: 15/184,006

(22) Filed: Jun. 16, 2016

(65) Prior Publication Data
US 2017/0365925 A1 Dec. 21, 2017

(51) Int. Cl.
*H01Q 3/38* (2006.01)

(52) U.S. Cl.
CPC .................................... *H01Q 3/38* (2013.01)

(58) Field of Classification Search
CPC ............... H01Q 3/36; H01Q 3/38; H01Q 3/14
USPC .... 342/81, 154, 368, 372, 373; 343/700 MS
See application file for complete search history.

(56) References Cited

U.S. PATENT DOCUMENTS

| | | | | |
|---|---|---|---|---|
| 4,639,732 A | * | 1/1987 | Acoraci | H01Q 3/267 342/165 |
| 2004/0160374 A1 | | 8/2004 | Johansson et al. | |
| 2008/0150514 A1 | | 6/2008 | Codreanu et al. | |
| 2009/0231197 A1 | | 9/2009 | Richards et al. | |
| 2010/0295729 A1 | * | 11/2010 | Nogami | H01Q 1/2216 342/372 |
| 2013/0314280 A1 | | 11/2013 | Maltsev et al. | |

FOREIGN PATENT DOCUMENTS

| | | |
|---|---|---|
| CN | 1748340 A | 3/2006 |
| JP | 07318627 A | 12/1995 |
| JP | 10197629 A | 7/1998 |
| JP | 2006074191 A | 3/2006 |

OTHER PUBLICATIONS

IEEE Standard for Information Technology-Telecommunications and information exchange between systems, Local and metropolitan area networks-specific requirements, Part 11: Wireless LAN Medium Access Control (MAC) and Physical Layer (PHY) Specifications, Amendment 3: Enhancements for Very High Throughput in the 60 GHz Band, IEEE Std 802.11 ad™-2012, Dec. 28, 2012, pp. 1-627.
Paulraj, A. et al., Estimation of Signal Parameters via Rotational Invariance Techniques-Esprit, Information Systems Laboratory, Stanford University, IEEE 1986, pp. 83-89.
Schmidt, Ralph O., Multiple Emitter Location and Signal Parameter Estimation, IEEE Transactions on Antennas and Propagation, vol. AP-34, No. 3, Mar. 1986, pp. 276-280.

\* cited by examiner

*Primary Examiner* — Dao L Phan

(57) ABSTRACT

Signals are received from antenna elements in an antenna array, and respective phase shifts are applied to the received signals. The respective phase shifts are relative to a channel phase shift associated with each antenna element, and correspond to side angles from a current antenna beam direction of the antenna array. Control signals based on the phase shifted signals are generated to control the channel phase shifts, to provide beamforming tracking.

29 Claims, 13 Drawing Sheets

APPARATUS AND METHODS FOR BEAMFORMING TRACKING

FIELD

The present disclosure relates generally to communications and, in particular, to beamforming tracking for antenna arrays.

BACKGROUND

Antenna arrays with multiple antenna elements are used in various types of communication equipment. Controlling the phases of signals that are fed to and from antenna elements of an antenna array enables steering of antenna beams. This is referred to as beam steering or beamforming.

SUMMARY

Variable phase shifters are coupled to receive signals from respective antenna elements in an antenna array. Each variable phase shifter includes a pair of phase shift elements to apply respective phase shifts relative to a channel phase shift associated with the antenna element from which the variable phase shifter receives signals. These respective phase shifts correspond to side angles from a current antenna beam direction of the antenna array. A beamforming tracking controller is coupled to receive phase shifted signals from the variable phase shifters, and is configured to generate control signals based on the phase shifted signals to control the channel phase shifts. The beamforming tracking controller could be implemented in analog circuitry, or as a digital component such as a processor or other electronic device that is configured to generate the control signals.

In another embodiment, a method involves receiving signals from antenna elements in an antenna array, applying the respective phase shifts relative to the channel phase shifts associated with the antenna elements, and generating control signals based on phase shifted signals to control the channel phase shifts.

The channel phase shifts and the respective phase shifts relative to the channel phase shifts could be applied separately, by applying the channel phase shifts to the signals received by the antenna elements and then applying the respective relative phase shifts to the channel phase shifted signals. In another embodiment, the signals received by each antenna element are phase shifted by applying a first phase shift corresponding to the channel phase shift associated with the antenna element plus a delta phase shift corresponding to a first side angle in a first direction, and applying a second phase shift corresponding to the channel phase shift less a delta phase shift corresponding to a second side angle in a second direction different from the first direction.

Beamforming tracking could be implemented in conjunction with a one-dimensional linear antenna array and side angles in opposite directions from the current antenna beam direction of the antenna array. In a two-dimensional array, the side angles are in four directions, and respective phase shifts, relative to the channel phase shifts and corresponding to the four side angles, are applied to received signals.

In some embodiments, signals that are phase shifted by the respective phase shifts are combined, to implement a cosine window function for example.

Any one or more of signal amplification, frequency downconversion, and analog to digital conversion could also be implemented in receive signal paths.

Communication equipment could include an antenna array, variable phase shifters, and a beamforming tracking controller, to implement beamforming tracking in user equipment and/or communication network equipment. Such communication equipment could also include a receiver, a transmitter, or a transceiver.

Similarly, a method could be implemented at user equipment and/or communication network equipment.

Other embodiments are also contemplated. For example, a non-transitory processor-readable medium could be used to store instructions which, when executed by one or more processors, cause the one or more processors to perform a method. Such a method could involve receiving phase shifted signals, which were received at antenna elements and phase shifted by the respective phase shifts relative to the channel phase shifts, and generating control signals based on phase shifted signals to control the channel phase shifts.

Other aspects and features of embodiments of the present disclosure will become apparent to those ordinarily skilled in the art upon review of the following description.

BRIEF DESCRIPTION OF THE DRAWINGS

Examples of embodiments of the invention will now be described in greater detail with reference to the accompanying drawings.

DETAILED DESCRIPTION

According to one conventional beamforming tracking technique, each antenna element in an array is connected to a respective digital processing channel. Target tracking for received signals is often based on an algorithm such as the Multiple Signal Classification (MUSIC) algorithm or the Estimation of Signal Parameters via Rotational Invariance Technique (ESPRIT) algorithm. An advantage of such tracking techniques is high tracking accuracy. However, there is also a drawback in that implementation is very expensive in hardware. A separate digital processing channel is required for each antenna element, which is not practical with large number of antenna elements. For example, an antenna array could include over one hundred antenna elements, for which separate digital processing channels might not be practical.

Another conventional technique involves scanning two "delta" angles or side angles, in opposite directions relative to a current antenna beam angle. The two delta angles are scanned in two time slots, and a determination as to the direction in which the beam angle should be moved is then made based on the delta angle at which the overall received signal had stronger power. This is a simple, robust algorithm, but involves high system overhead and slow response (several milliseconds or longer) due to beam switching time and baseband processing time associated with scanning the delta angles separately in respective time slots. This technique is also prone to low Signal to Noise Ratio (SNR) in a tracking mode that uses a dithering approach, losing a few dB SNR for tracking.

Embodiments disclosed herein provide for delta angle signal processing simultaneously with center channel signal processing, without requiring a separate digital processing channel for each antenna element or separate time slots for capturing or processing each delta angle signal, or "side signal". Delta angle phase shifts, corresponding to delta angles in different directions from a current antenna beam direction, are applied to received signals. Channel phase shifts applied to signals received at respective antenna elements are then controlled to adaptively realign a beam direction based on the delta angle phase shifted signals. Complexity and hardware cost could be lower relative to providing a separate digital processing channel for each antenna element, and beam tracking may be faster than in implementations that involve delta angle scans in respective time slots.

Figure 1:
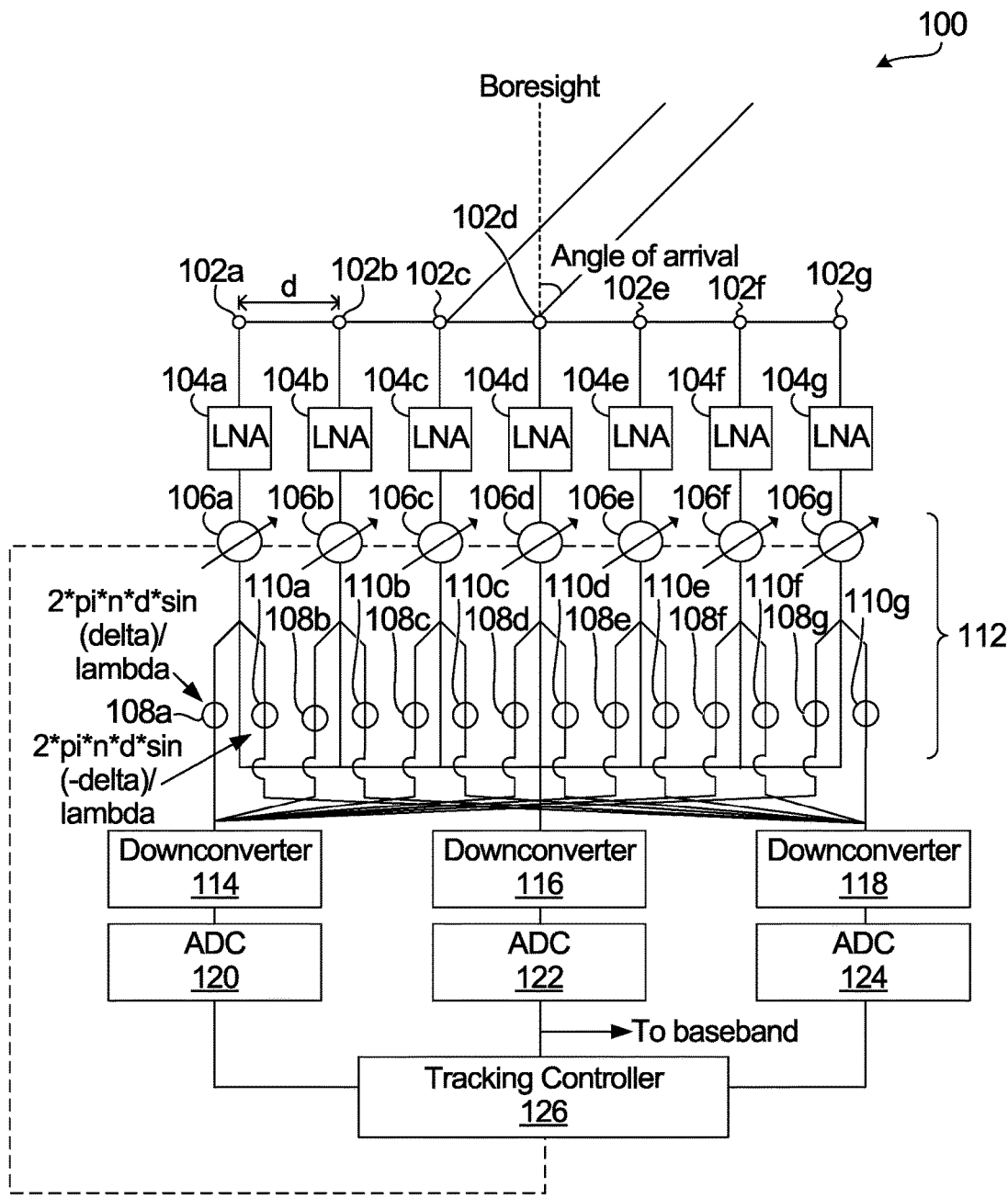
FIG. 1 is a block diagram of an example beamforming tracking apparatus according to an embodiment, with a main channel path, side channel paths, variable main channel phase shift elements, and fixed side channel phase shift elements.

FIG. 1 is a block diagram of an example beamforming tracking apparatus according to an embodiment, with a main channel path, side channel paths, variable main channel phase shift elements, and fixed side channel phase shift elements. The apparatus 100 includes antenna elements 102a-102g, Low-Noise Amplifiers (LNAs) 104a-104g, variable phase shifters generally denoted as 112, frequency downconverters 114, 116, 118, analog to digital converters (ADCs) 120, 122, 124, and a tracking controller 126. There are seven variable phase shifters 112 in the example shown, and each variable phase shifter includes one variable phase shift element 106a-106g and a pair of fixed phase shift elements 108a/110a-108g/110g. The dashed lines between the tracking controller 126 and the variable phase shift elements 106a-106g represent a control connection for providing control signals from the tracking controller to the variable phase shift elements.

The antenna elements 102a-102g form an antenna array. The antenna elements 102a-102g could take any of various forms, depending on the type of communication equipment in which the components shown in FIG. 1 are implemented. Patch antenna elements could be implemented in user equipment, for example, where space is limited, whereas a physically larger antenna array aperture could be implemented in network equipment.

LNAs are common in wireless communication equipment, and any of various amplifier circuitry implementations could be used for the LNAs 104a-104g.

There are also various options for implementing the variable phase shift elements 106a-106g and the fixed phase shift elements 108a-108g, 110a-110g. For example, vector modulators could be used to implement the variable phase shift elements 106a-106g. Fixed delay lines represent one possible option for implementing the fixed phase shift elements 108a-108g, 110a-110g. Implementation of each of the fixed phase shift elements 108a-108g, 110a-110g using a single pole multiple throw switch coupled to multiple fixed delay lines could provide selectivity in the delta angle phase shifts that are applied by the fixed phase shift elements. Thus, the delta angles, or "side angles", for the fixed phase shift elements 108a-108g, 110a-110g need not be fixed at only one particular value in every embodiment. The variable phase shift elements 106a-106g would have a higher resolution and larger phase shift range than the fixed phase shift elements 108a-108g, 110a-110g, but there could be some flexibility or adjustability in the delta angle phase shifts that are applied by the fixed phase shift elements in some embodiments. An implementation of the fixed phase shift elements 108a-108g, 110a-110g using multiple fixed delay lines could also or instead be preferred to enable different delta angles to be set for different applications of beamforming tracking by changing switch positions, without requiring a change in circuit structure.

Frequency downconverters are also common in wireless communication equipment, to convert radio frequency (RF) signals to Intermediate Frequency (IF) or lower-frequency signals. Such frequency conversion typically involves mixing signals. Any of various types of frequency conversion circuitry could be used to implement the frequency downconverters 114, 116, 118.

The LNAs 104a-104g, the variable phase shifters 112, and the frequency downconverters 114, 116, 118 are implemented in RF Complementary Metal Oxide Semiconductor (CMOS) technology in one embodiment. This may provide a physically small solution compared to other technologies, especially when a multiple RF channel integrated circuit (IC) is implemented. A smaller and more functional IC design could also simplify the phased array antenna design.

ADCs are also common in wireless communication equipment, and any of various types of ADC circuitry could be used to implement the ADCs 120, 122, 124.

The tracking controller 126 could be implemented using hardware, firmware, or one or more components that execute software, or some combination thereof. Electronic devices that might be suitable for implementing the tracking controller 126 include, among others, microprocessors, microcontrollers, Programmable Logic Devices (PLDs), Field Programmable Gate Arrays (FPGAs), Application Specific Integrated Circuits (ASICs), and other types of "intelligent" integrated circuits. Software could be stored in memory for execution. The memory could include one or more physical memory devices, including any of various types of solid-state memory devices and/or memory devices with movable or even removable storage media.

Signals received at the antenna elements 102a-102g are amplified by the LNAs 104a-104g. Received signals might not be amplified in all embodiments, and therefore the LNAs 104a-104g are optional. In transmit signal paths, phase shifters are usually located before amplifiers for linearity.

The variable phase shift elements 106a-106g are controlled by the tracking controller 126 to apply respective phase shifts to the received signals. Each antenna element 102a-102g could be considered to be receiving a respective beamforming channel, to which a respective channel phase shift is applied. These channel phase shifts control the beam direction or "steer" the antenna beam of the array of antenna elements 102a-102g. Each variable phase shift element 106a-106g is controlled to apply a respective phase shift corresponding to the channel phase shift associated with the antenna element 102a-102g from which it receives signals.

The fixed phase shift elements 108a/110a-108g/110g implement a form of delta angle directivity. The phase shifts applied by the fixed phase shift elements 108a-108g correspond to side angles in opposite directions or polarities from a current antenna beam direction, for a one-dimensional linear antenna array. In the embodiment shown in FIG. 1, the phase shifts applied by the fixed phase shift elements 108a-108g are $2*\pi*n*d*\sin(\text{delta})/\text{lambda}$, and the phase shifts applied by the fixed phase shift elements 110a-110g are $2*\pi*n*d*\sin(-\text{delta})/\text{lambda}$. In these expressions, n is an index of the antenna element from which the fixed phase shift element 108a-108g, 110a-110g receives signals and varies from 1 to 7 for the example apparatus 100, d is a distance between the antenna elements 102a-102g in a linear array as shown in FIGS. 1 to 4, delta is the delta angle, and lambda is the wavelength of the received signals.

The downconverter 114 is coupled to the fixed phase shift elements 108a-108g, which apply a first phase shift corresponding to a first side angle in one direction, and the downconverter 118 is coupled to the fixed phase shift elements 110a-110g, which apply a phase shift corresponding to a second side angle, which has the same magnitude as the first side angle but is in the opposite direction for a one-dimensional linear antenna array in which beamforming tracking sensitivity or resolution is to be the same in both tracking directions. The apparatus 100 also has main channel paths which couple the downconverter 116 to the variable phase shift elements 106a-106g. In some embodiments, further processing of the phase shifted signals could be performed without frequency downconversion by the downconverters 114, 116, 118, and accordingly the downconverters are optional.

The ADCs 120, 122, 124 are coupled to the downconverters 114, 116, 118 in the apparatus 100, and convert signals from analog to digital. The tracking controller 126 receives the digital signals and generates control signals to control the channel phase shifts applied by the variable phase shift elements 106a-106g.

In an embodiment, the tracking controller 126 implements received signal power-based tracking, which is also referred to herein as "power law" tracking. For example, denoting the angle of arrival of a received signal as "phi", a "+delta" side angle as "right" and a "−delta" side angle as "left", one form of power law tracking could be stated as follows:

if power(phi+delta)<power(phi−delta)
   move the beam direction to the right by a tracking angle
   else move the beam direction to the left by a tracking angle.

In the above example, the tracking controller 126 need not be coupled to the main channel ADC 122 since this power law tracking example uses only power(phi+delta) and power (phi−delta). The side channel ADCs 120 and 124 are optional, and the tracking controller 126 can be configured to receive analog downconverted signals from the side channel downconverters 114, 118, for determining the power level of these signals.

Power law tracking could also or instead involve comparing one or both of power(phi+delta) and power(phi−delta) to power(phi). For instance, when power(phi+delta) and power(phi−delta) are each lower than power(phi), the antenna beam may be considered to be aligned closely with the actual angle of arrival of a received signal, so that no re-directing of the antenna's angular sensitivity is required. When one of power(phi+delta) and power(phi−delta) is greater than power (phi), a corresponding redirecting of the receiving angle can be performed.

The tracking angle by which the antenna beam is realigned need not be the same as the delta angle. The tracking angle is fixed in some embodiments, but could instead be changed based on a magnitude of the difference in power(phi+delta) and power(phi−delta) in other embodiments. For example, the magnitude of the signal power difference could be proportional to the degree to which the current beam direction is out of alignment with the angle of arrival of a received signal. Using larger tracking angles when the signal power difference is above a threshold could provide for faster re-alignment to the angle of arrival, relative to maintaining a fixed, smaller tracking angle. The tracking angle could also or instead adapt to a smaller angle for signal power differences that are below a threshold. Multiple thresholds and tracking angles could be used. For example, there could be an upper threshold and a lower threshold and three different tracking angles respectively associated with signal power differences below the lower threshold, between the upper and lower thresholds, and above the upper threshold.

In another embodiment, the tracking controller 126 uses angle of arrival (AoA) gradient tracking. For example, a correlation matrix and 2×2 eigen-decomposition of the 2×2 correlation matrix could be calculated in accordance with the MUSIC algorithm. The AoA gradient could then be determined by taking a derivative of the MUSIC cost function.

Control signals are provided to the variable phase shifters 112, and in particular to the variable phase shift elements 106a-106g in the apparatus 100. Control signals could also be provided to the fixed phase shift elements 108a-108g, 110a-110g. As noted above, the fixed phase shift elements 108a-108g, 110a-110g could be implemented using multiple fixed delay lines. Such an implementation could provide for selection between different fixed phase shifts.

The apparatus 100 includes components which may be involved in beamforming tracking. Communication equipment in which the apparatus 100 is implemented, or communication equipment to which the apparatus 100 is coupled, could include other components as well. For example, digital signals converted from the main channel received signals could be provided to baseband processing circuitry of a receiver or transceiver. This is represented generally in FIG. 1 by the label "To baseband".

Figure 2:
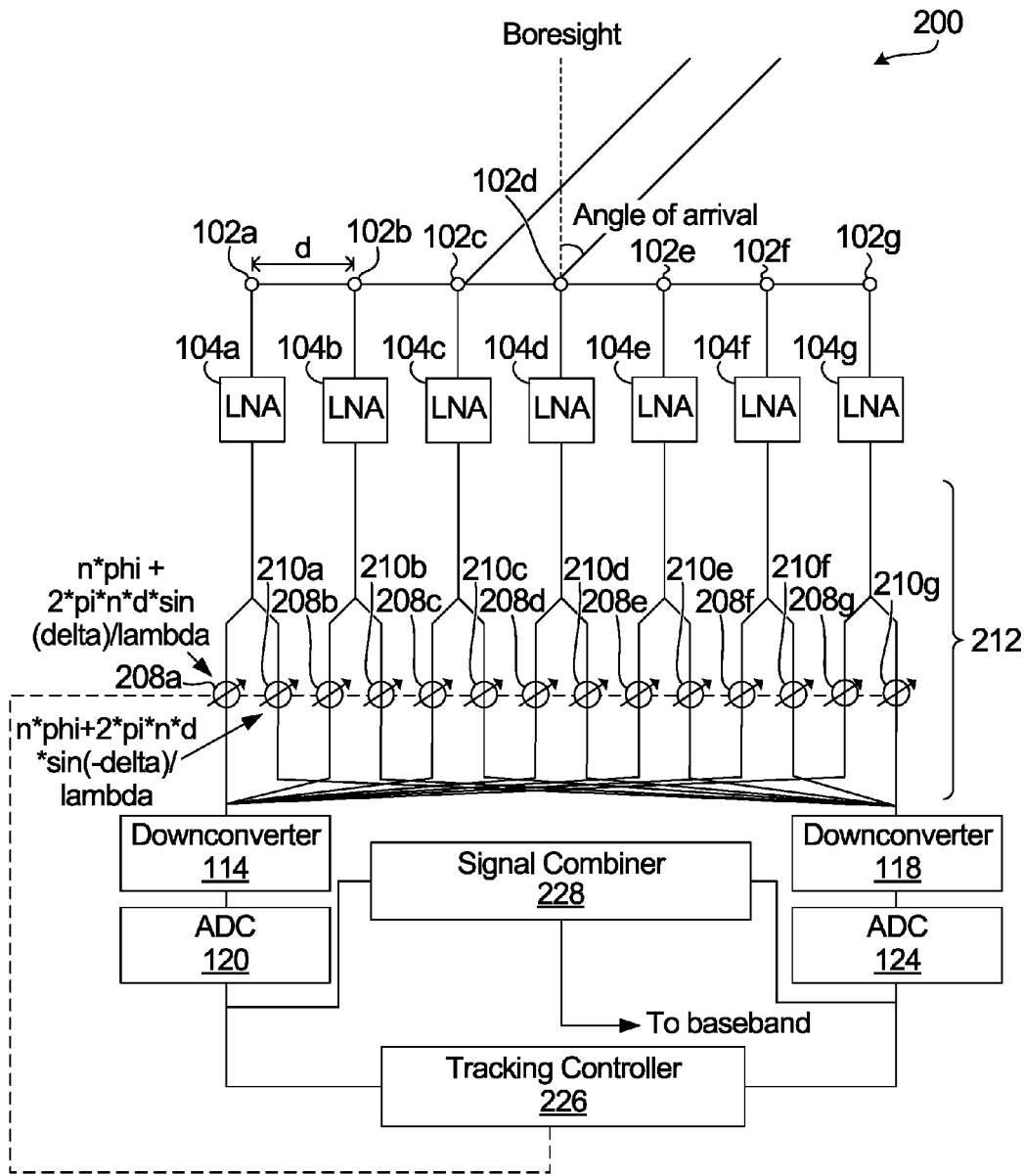
FIG. 2 is a block diagram of an example beamforming tracking apparatus according to another embodiment, with side channel paths, variable side channel phase shift elements, and a signal combiner.

FIG. 2 is a block diagram of an example beamforming tracking apparatus according to another embodiment, with side channel paths, variable side channel phase shift elements, and a digital signal combiner. The apparatus 200 is similar in structure and operation to the apparatus 100 in FIG. 1. However, the apparatus 200 includes a different implementation of variable phase shifters 212. In the apparatus 200, each variable phase shifter includes only a pair of fixed phase shift elements 208a/210a-208g/210g. The apparatus 200 also includes only "side" channel downconverters 114, 118 and ADCs 120, 124. There is no main channel downconverter and no main channel ADC in this embodiment. The apparatus 200 instead includes a signal combiner 228. As in FIG. 1, the dashed lines in FIG. 2 represent a control connection. In FIG. 2, the control connection is used for providing control signals from the tracking controller 226 to variable phase shift elements 208a-208g, 210a-210g.

The signal combiner 228 could be implemented using hardware, firmware, or one or more components that execute software, or some combination thereof. Examples of electronic devices that might be suitable for such implementations are noted above. Implementation examples for the other components shown in FIG. 2, including variable phase shift elements, are also provided above. In FIG. 2, the signal combiner 228 is a digital combiner. A CMOS IC implementation of a signal combiner, with other CMOS components identified above for example, is also contemplated in other embodiments.

The variable phase shift elements 208a-208g, 210a-210g are controlled by the tracking controller 226 to apply respective phase shifts to signals which are received by the antenna elements 102a-102g and optionally amplified by the LNAs 104a-104g. As shown in FIG. 2, however, the phase shifts applied by the variable phase shift elements 208a-208g, 210a-210g include an additional "n*phi" term. At least this term of the phase shifts is controlled by the tracking controller 226. In FIG. 1, the variable "n*phi" phase shifts are applied by the variable phase shift elements 106a-106g, and the fixed $2*\pi*n*d*\sin(+/-\text{delta})/\text{lambda}$ phase shifts are applied by the fixed phase shift elements 108a-108g, 110a-110g. In FIG. 2, the variable phase shifts and the fixed phase shifts are applied by the variable phase shift elements 208a-208g, 210a-210g.

The frequency downconverter 114 is coupled to the fixed phase shift elements 208a-208g, which apply a phase shift corresponding to a first side angle in one direction relative to the current antenna beam direction, and the frequency downconverter 118 is coupled to the fixed phase shift elements 210a-210g, which apply a phase shift corresponding to a second side angle, which is in the opposite direction for a one-dimensional linear antenna array.

The ADCs 120, 124 are coupled to the frequency downconverters 114, 118, and convert signals from analog to digital. The tracking controller 226 receives the digital signals and generates control signals to control the phase shifts applied by the variable phase shift elements 208a-208g, 210a-210g. Power law tracking based on power(phi+delta) and power(phi-delta) does not involve the main channel signals, and could be used by the tracking controller 226 in generating control signals. The tracking controller 226 could also or instead use AoA gradient tracking.

The signal combiner 228 combines the digital side signals to generate main channel signals for further processing. The signal combination by the signal combiner 228 could be a simple summation, which acts as a cosine window and may provide an advantage in terms of side lobe suppression as noted below. Combined signals are not used in beamforming tracking in the apparatus 200, and therefore the signal combiner 228 could be implemented as part of a receiver or transceiver instead of in a beamforming tracking system.

Figure 3:
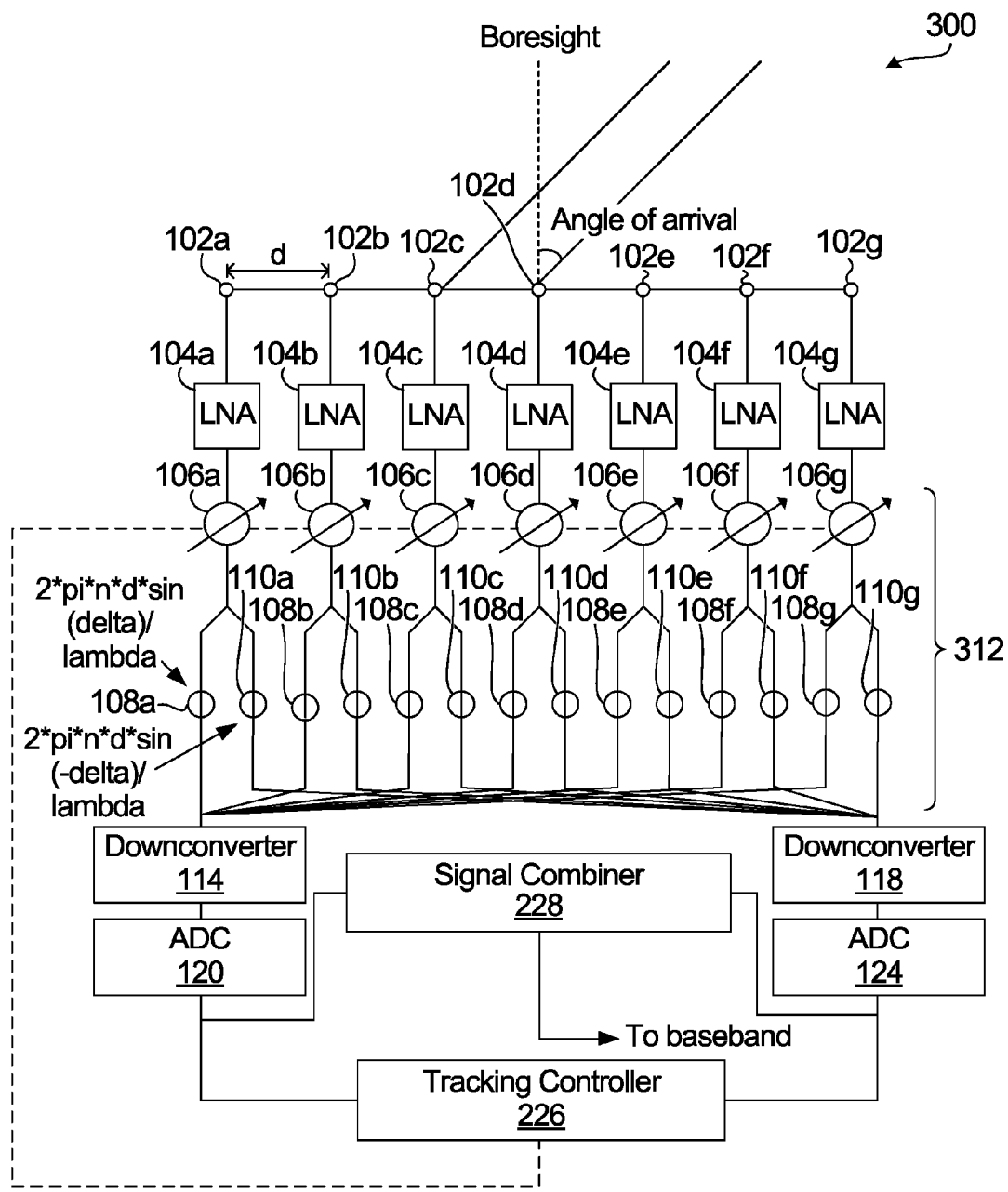
FIG. 3 is a block diagram of an example beamforming tracking apparatus according to another embodiment, with side channel paths, variable main channel phase shift elements, fixed side channel phase shift elements, and a signal combiner.

An example apparatus according to another embodiment is shown in FIG. 3. FIG. 3 is a block diagram of an example beamforming tracking apparatus according to another embodiment, with side channel paths, variable main channel phase shift elements, fixed side channel phase shift elements, and a signal combiner. The apparatus 300 is similar in structure and operation to the apparatus 200 in FIG. 2, but includes a different implementation of variable phase shifters 312. In the apparatus 300, each variable phase shifter includes a variable phase shift element 106a-106g and a pair of fixed phase shift elements 108a/110a-108g/110g. The variable phase shifters 312 are nearly identical to the variable phase shifters 112 in FIG. 1, with the exception that the variable phase shifters 312 do not include main channel paths coupling the variable phase shifters 106a-106g to a frequency downconverter or ADC. Operation of the apparatus 300 is the same as that of the apparatus 200 in FIG. 2, except that the channel and side phase shifts are applied separately in the variable phase shift elements 106a-106g and the fixed phase shift elements 108a/110a-108g/110g, and the control signals from the tracking controller 226 are provided to the variable phase shift elements 106a-106g.

Figure 4:
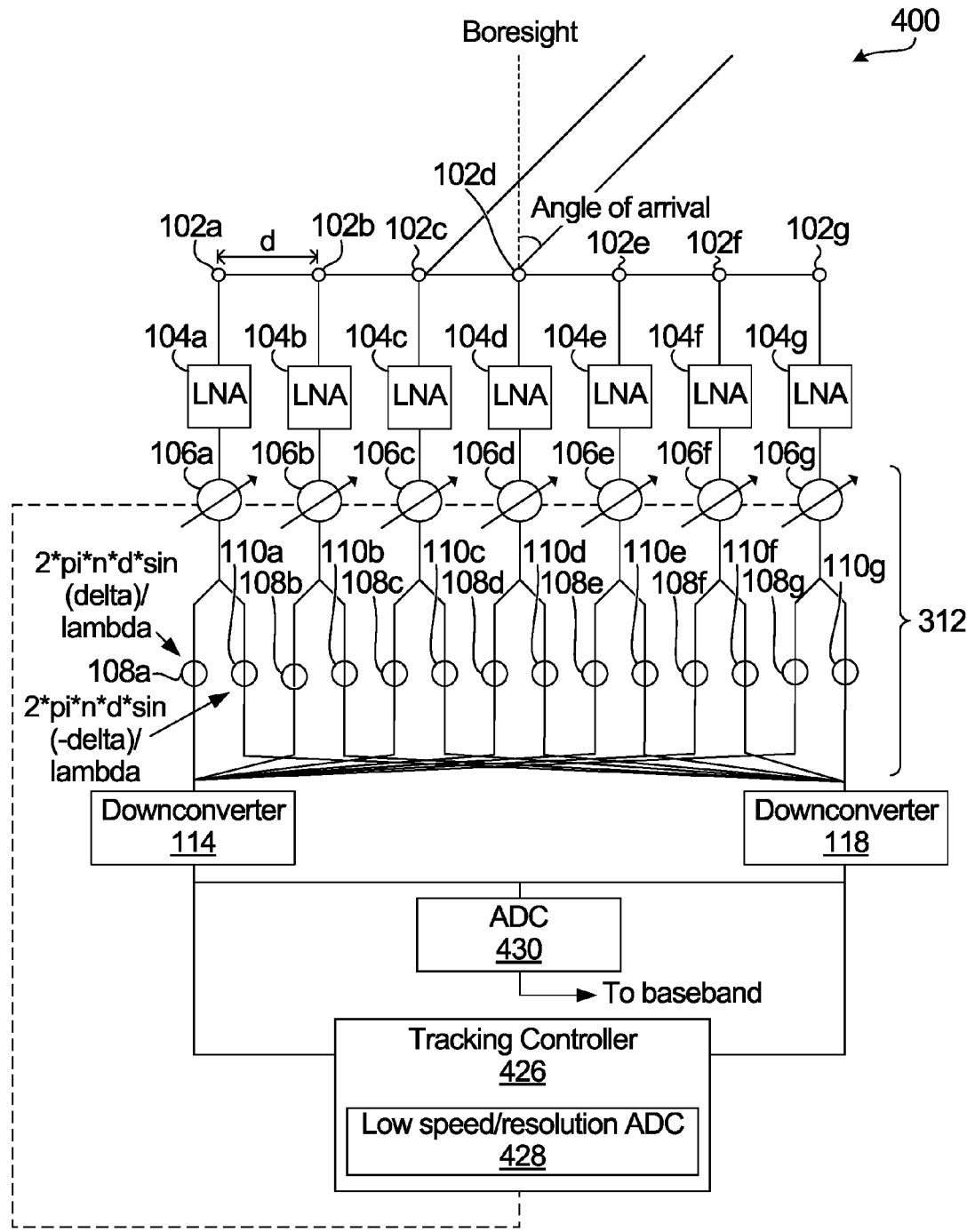
FIG. 4 is a block diagram of an example beamforming tracking apparatus according to another embodiment, with an analog tracking controller.

FIG. 4 is a block diagram of an example beamforming tracking apparatus according to another embodiment, with an analog tracking controller. The apparatus 400 is similar in structure and operation to the apparatus 300 in FIG. 3. However, the apparatus 400 includes only a single ADC 430. Digital signals generated by the ADC 430 could be processed by a signal combiner and/or other receiver or transceiver components. The tracking controller 426 is an analog controller, which could implement at least power law tracking. An ADC 428 could be provided in embodiments in which the variable phase shift elements 106a-106g are digitally controlled. The ADC 428 could be implemented as part of the tracking controller 426 as shown, or as a separate component.

ADC speed and resolution may be important for received signal processing, but might not be as important for phase shift control signals. The ADC 428 could therefore have a lower speed and/or lower resolution ADC than the ADC 430.

An analog tracking controller 426 as shown in FIG. 4 could be implemented in conjunction with different variable phase shifters than 312. The variable phase shifters 212 (FIG. 2) could be substituted for the variable phase shifters 312, for example.

FIGS. 1 to 4 show several embodiments of beamforming tracking systems. In these systems, even though there are seven antenna elements 102a-102g receiving seven main beamforming channels, there are fewer than seven digital processing channels. There are only three digital processing channels and ADCs in FIG. 1, two in FIGS. 2 and 3, and one in FIG. 4. ADCs are expensive in terms of both component cost and circuit complexity, and therefore reducing the number of ADCs can be advantageous.

The embodiments described above with reference to FIGS. 1 to 4 relate to one-dimensional beamforming. The techniques disclosed herein could also or instead be applied to multi-dimensional beamforming. The example apparatus in each of FIGS. 5 and 6 are illustrative of two-dimensional beamforming embodiments.

Figure 5:
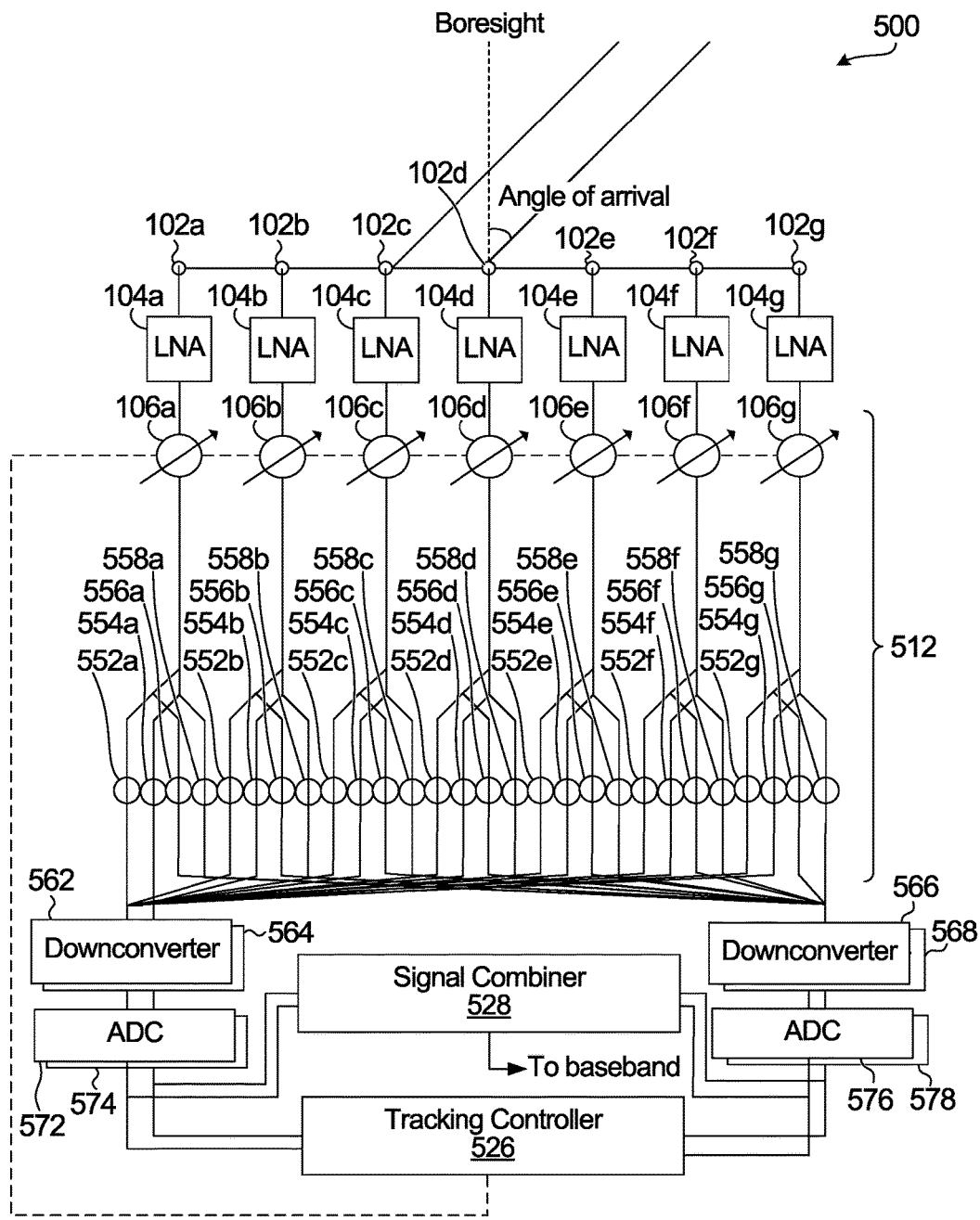
FIG. 5 is a block diagram of an example beamforming tracking apparatus according to another embodiment, for two-dimensional beamforming tracking with a digital tracking controller.
Figure 6:
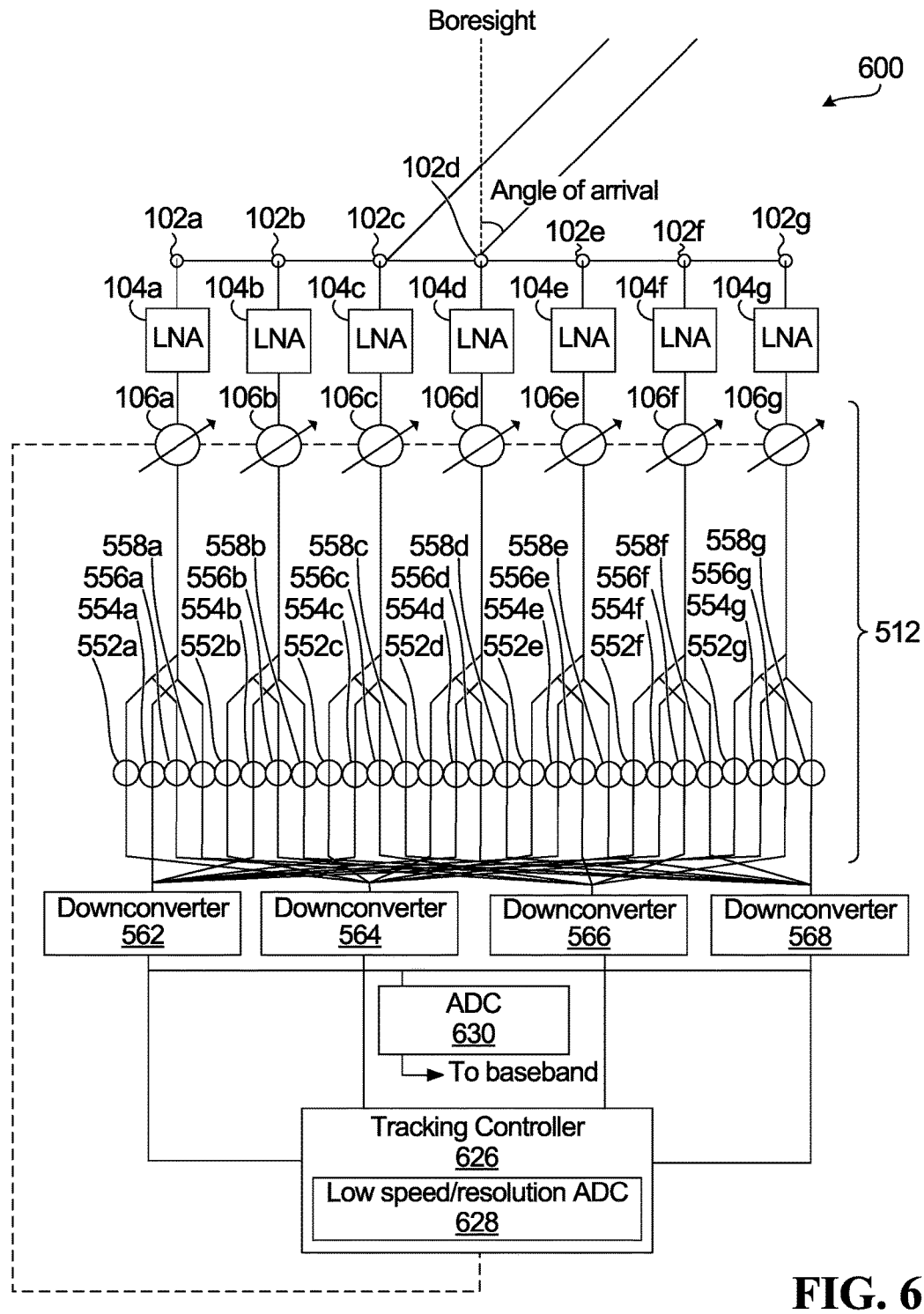
FIG. 6 is a block diagram of an example beamforming tracking apparatus according to another embodiment, for two-dimensional beamforming tracking with an analog tracking controller.

FIG. 5 is a block diagram of an example beamforming tracking apparatus according to another embodiment, for two-dimensional beamforming tracking with a digital tracking controller. Although the example apparatus 500 in FIG.

5 is similar in structure to the example apparatus 400 in FIG. 4, the antenna elements 102a-102g are arranged in a two-dimensional planar array instead of in a linear array, for two-dimensional beamforming tracking. Also, instead of scanning in only two opposite directions as in one-dimensional beamforming tracking, two-dimensional beamforming tracking involves four side angles.

Figure 5A:
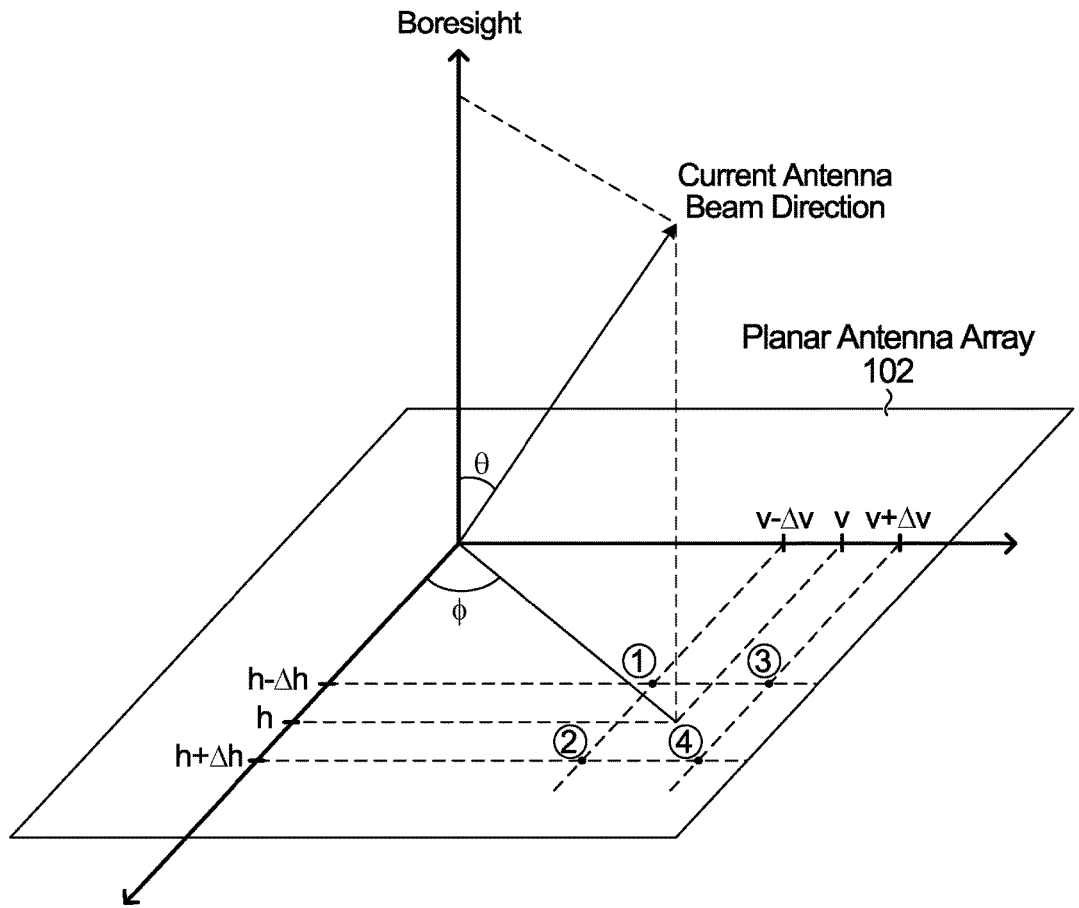
FIG. 5A illustrates an example of two-dimensional beamforming tracking.

FIG. 5A illustrates an example of two-dimensional beamforming tracking, in conjunction with a planar antenna array 102. In an embodiment, two-dimensional beamforming tracking uses the following rules:

$$h = h - \mu g_h$$

$$v = v - \mu g_v,$$

where h is the horizontal angular value of the antenna beam direction as shown in FIG. 5A, v is the vertical angular value of the antenna beam direction as shown in FIG. 5A, $\mu$ is a step size and $g_h$ and $g_v$ are gradients in the horizontal and vertical directions. The values of h and v for a current antenna beam direction are $\sin(\theta)*\cos(\varphi)$ and $\sin(\theta)*\sin(\varphi)$, respectively.

For power law beamforming tracking, four power values y1, y2, y3, and y4 are sampled in the following four angular directions in one embodiment:

$$[\sin(\theta)*\cos(\varphi)-\Delta h, \sin(\theta)*\sin(\varphi)-\Delta v]$$

$$[\sin(\theta)*\cos(\varphi)+\Delta h, \sin(\theta)*\sin(\varphi)-\Delta v]$$

$$[\sin(\theta)*\cos(\varphi)-\Delta h, \sin(\theta)*\sin(\varphi)+\Delta v]$$

$$[\sin(\theta)*\cos(\varphi)+\Delta h, \sin(\theta)*\sin(\varphi)+\Delta v].$$

$\Delta h$, $\Delta v$, and projections of the four side angle directions onto the h-v plane are shown in FIG. 5A. These projections are associated with different values of $\theta$ and $\varphi$, and therefore correspond to respective side angles from the current antenna beam direction. $\Delta h$ and $\Delta v$ have the same magnitude in embodiments in which tracking sensitivity or resolution in the h and v directions is the same The sampled power values y1, y2, y3, and y4 correspond to antenna beam directions with the h-v projection coordinates labelled 1, 2, 3, and 4, respectively, in FIG. 5A.

Applying phase shifts that respectively correspond to the four side angles involves four groups of phase shift elements 552a-552g, 554a-554g, 556a-556g, 558a-558g, as shown in FIG. 5. Each set of four phase shift elements such as 552a, 554a, 556a, 558a, in each variable phase shifter 512, includes a pair of phase shift elements to apply phase shifts corresponding to two side angles from the current antenna beam direction, as in the one-dimensional beamforming tracking embodiments. In FIG. 5, each variable phase shifter 512 also includes a second pair of phase shift elements to apply phase shifts corresponding to a further pair of side angles as well.

With reference to FIG. 4, there are two groups of fixed phase shift elements 108a-108g and 110a-110d, each coupled to one of the two frequency downconverters 114, 118. In FIG. 5, there are four groups of fixed phase shift elements 552a-552g, 554a-554g, 556a-556g, 558a-558g, each coupled to one of four frequency downconverters 562, 564, 566, 568 in this example. Each of the frequency downconverters 562, 564, 566, 568 is coupled to a respective ADC 572, 574, 576, 578. The signal combiner 528 and the tracking controller 526 are coupled to the ADCs 572, 574, 576, 578, and operate substantially as described above. The signal combiner 528 combines the digital signals generated by the ADCs 572, 574, 576, 578 for subsequent processing, and the tracking controller 526 generates control signals for controlling the channel phase shifts applied by the variable phase shift elements 106a-106g based on the digital signals.

The side phase shifts in FIGS. 1 to 4 for one-dimensional beamforming tracking correspond to side angles in opposite directions from a current antenna beam direction. For two-dimensional beamforming tracking, a second pair of phase shift elements is provided in each variable phase shifter 512 to apply respective phase shifts corresponding to two more side angles from a current antenna beam direction of the antenna array.

The two side angles for one-dimensional beamforming tracking are in opposite directions relative to the current antenna beam direction. The four side angles for two-dimensional beamforming tracking are in different directions, and could also be in opposite directions. For example, beamforming tracking could be implemented with the four search directions $\theta+\Delta\theta$ and $\theta-\Delta\theta$ (with constant $\varphi$), and $\varphi+\Delta\varphi$ and $\varphi-\Delta\varphi$ (with constant $\theta$). In such an embodiment, there are two pairs of side angles in opposite directions, and in orthogonal ($\theta$ and $\varphi$) planes or orientations relative to the planar antenna array 102. In the example shown in FIG. 5A, pairs of the side angles may have h, v, and/or azimuth components that are in opposite directions relative to the current antenna beam direction, and in this sense could also be considered to be in opposite directions. The pairs of side angles corresponding to 1/2, 1/4, 3/2, and 3/4 also have $\varphi$ and/or $\theta$ components that are in opposite directions relative to the current antenna beam direction and could be considered to be in opposite directions in this sense as well.

The tracking controller 526 may determine which of the four scanned directions is toward the direction of arrival of the received signal, using power law tracking or AoA tracking, for example, and control the variable phase shift elements 106a-106g to realign the antenna array beam in that direction. In an embodiment, the tracking controller 526 determines which of y1, y2, y3, and y4 has a greatest value, and controls the variable phase shift elements 106a-106g to realign the antenna array beam toward the direction corresponding to 1, 2, 3, or 4.

Another example of two-dimensional power law tracking is based on adjusting h and v according to $h=h-\mu g_h$ and $v=v-\mu g_v$. In an embodiment, $g_h$ and $g_v$ are calculated as $g_h=y1+y3-y2-y4$ and $g_v=y1+y2-y3-y4$, and the step size $\mu$ is chosen by considering an expected minimum distance of the tracking target, an expected maximum moving velocity of the target, measurement frequency (how frequently tracking measurements are taken) and maximum values of $g_h$ and $g_v$. The maximum values of $g_h$ and $g_v$ are defined by the beam shape in the main lobe of the antenna pattern in the power law case, or by the MUSIC cost function in the MUSIC case. The measurement frequency is determined based on signal frame length. The minimum distance of the tracking target and maximum moving velocity of the target are application-dependent.

As an example, if $$\mu*\min(|g_h|) < \max \text{ velocity}/(\text{measurement frequency}*\min \text{ distance}) < \mu*\max(|g_h|)$$

and $$\mu*\min(|g_v|) < \max \text{ velocity}/(\text{measurement frequency}*\min \text{ distance}) < \mu*\max(|g_v|),$$

then the target is trackable. The minimum absolute value of $g_h$ and $g_v$ is always 0, and therefore in this example the step size $\mu$ can be chosen to be $$\mu > \text{max velocity}/(\text{measurement frequency}*\text{min distance}*\max(\max(|g_h|),\max(|g_v|))).$$

Consider an application to fixed point-to-point radio, with moving of the antenna array caused by wind, a minimum distance assumed to be 50 m, a maximum velocity of 1 m/s, maximum $g_h$ and $g_v$ values of 20 dB per degree (with $\Delta h$, $\Delta v$ set at sin(1 degree)) and measurement frequency of 1000 times/second. In this case, the step size $\mu > 1/(1000*50*20) = 10^{-6}$.

FIG. 6 is a block diagram of an example apparatus according to a further embodiment. The apparatus 600 is similar in structure and operation to the apparatus 500 in FIG. 5. However, the apparatus 600 includes only a single ADC 630. Digital signals generated by the ADC 630 could be processed by a signal combiner and/or other receiver or transceiver components. The tracking controller 626 is an analog controller, which could implement at least power law tracking. An ADC 628, which could be of lower speed and/or lower resolution than the ADC 630, is provided in embodiments in which the variable phase shift elements 106a-106g are digitally controlled. The ADC 628 could be implemented as part of the tracking controller 626 as shown, or as a separate component.

FIGS. 5 and 6 are example implementations of two-dimensional beamforming tracking. Other embodiments are also possible. The variable phase shifters 512 in FIG. 5, for example, could be implemented with main channel paths in addition to the side or side channel paths as shown, with a main channel frequency downconverter and/or a main channel ADC. Main channel and side phase shifts could be implemented using variable phase shift elements instead of the fixed phase shift elements 552a-552g, 554a-554g, 556a-556g, 558a-558g and the variable phase shift elements 106a-106g. Other variations may also be apparent from the description herein relating to one-dimensional beamforming tracking.

Figure 7:
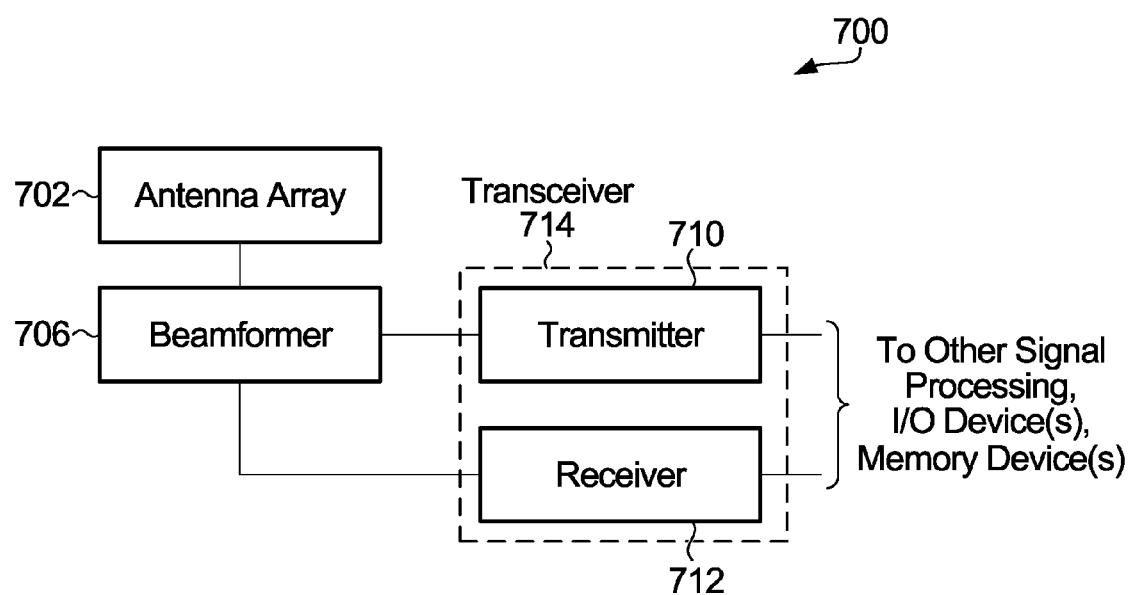
FIG. 7 is a block diagram of example communication equipment.

FIG. 7 is a block diagram of example communication equipment 700, which includes an antenna array 702. A beamformer 706 is coupled to the antenna array 702 in the example shown. A transmitter 710 and a receiver 712, which could be part of a transceiver 714, are coupled to the beamformer 706. The transmitter 710 and the receiver 712 could also be coupled to other components, such as one or more input/output devices, one or more memory devices, and/or other signal processing components which further process received signals or perform processing to generate signals for transmission on a wireless communication link through the antenna array 702.

The antenna array 702 includes multiple antenna elements, such as the antenna elements 102a-102g in FIGS. 1 to 6, and is an example of a physical interface to a communication medium. The antenna elements could take any of various forms as noted above, depending on the type of communication equipment in which the components shown in FIG. 7 are implemented.

The beamformer 706 includes a beamforming tracking system, which could be as shown in any of FIGS. 1 to 6, with the receiver 712 coupled to the "To baseband" connection in FIGS. 1 to 6, for example. The beamformer 206 could also include transmit path components coupled to the transmitter 710. For example, transmit paths could include main channel digital to analog DACs instead of ADCs, to convert digital transmit signals to analog, and/or frequency upconverters instead of frequency downconverters to convert transmit signals to RF. Any of various types of DAC circuitry or frequency upconverting circuitry could be used. Signal transmission could use the same variable phase shift elements 106a-106g as the beamforming tracking system, or a separate set of variable phase shifters. Side channel variable phase shift elements such as the variable phase shift elements 108a-108g, 110a-110g could potentially be used in transmit paths, with a signal combiner in each transmit path to combine the side channel signals into a main channel signal for transmission by each antenna element. However, a separate set of variable phase shift elements for the transmit paths may be preferred in embodiments in which a beamforming tracking system does not include main channel phase shift elements.

Although shown as a single block in FIG. 7, the beamformer 706 could include separate receive and transmit beamformers. Time Domain Duplexing (TDD), for example, could be used to coordinate receive and transmit operations for a single beamformer. Separate receive and transmit beamformers could support other duplexing techniques such as Frequency Domain Duplexing (FDD).

The transmitter 710 and the receiver 712 could be implemented in hardware, firmware, or one or more components that execute software. Communication equipment need not necessarily support both transmit and receive functions, and therefore in some embodiments only a transmitter 710 or only a receiver 712 might be provided. Beamforming tracking could be used in conjunction with a transmitter 710, a receiver 712, or both as in the transceiver 714 in FIG. 7. For example, beamforming tracking could be used to align an antenna beam toward remote communication equipment. Channel phase shifts that are determined during such beamforming tracking could be used in transmit beamforming for transmitting signals to the remote communication equipment. Received signals could be used only for beamforming tracking, and need not necessarily be otherwise processed in embodiments in which beamforming tracking is used only for antenna beam alignment for transmitting signals to remote communication equipment.

Beamforming tracking could be implemented in user equipment or communication network equipment. Implementation details of the various components of the example communication equipment 700 could be different for different types of communication equipment. As noted above, different types of antenna elements could be implemented in the antenna array 702 depending upon whether the example communication equipment 700 is user equipment or network equipment. Antenna element numbers and designs could depend not only on the physical space available for the antenna array 702, but also or instead on the frequency at which the antenna elements are to be operated and other characteristics of the wireless communication link or links that are to be provided. It is also possible that communication equipment could include multiple antenna arrays, for different receive and transmit frequencies or different communication links for instance. Network equipment in an access network, for example, could include different antenna arrays for network-side communication links and access-side communication links. Designs of any of the beamformer 706, the transmitter 710, and the receiver 712 could also be different in different types of communication equipment.

In operation, outgoing signals to be transmitted through the antenna array 702 are generated by the transmitter 710 and provided to the beamformer 706, which controls the channel phase shifts that are applied in transmit beamforming. As noted above, these phase shifts could be based on the channel phase shifts that are used for antenna beam alignment during beamforming tracking. Beamforming tracking could be applied in signal transmission and not only signal reception. The beamformer 706 feeds phase shifted transmit signals to the antenna elements in the antenna array 702.

In the receive direction, signals received at antenna elements of the antenna array 702 are used by the beamformer 706 for beamforming tracking, and may also be combined by the beamformer to generate an incoming signal for processing by the receiver 712.

Figure 8:
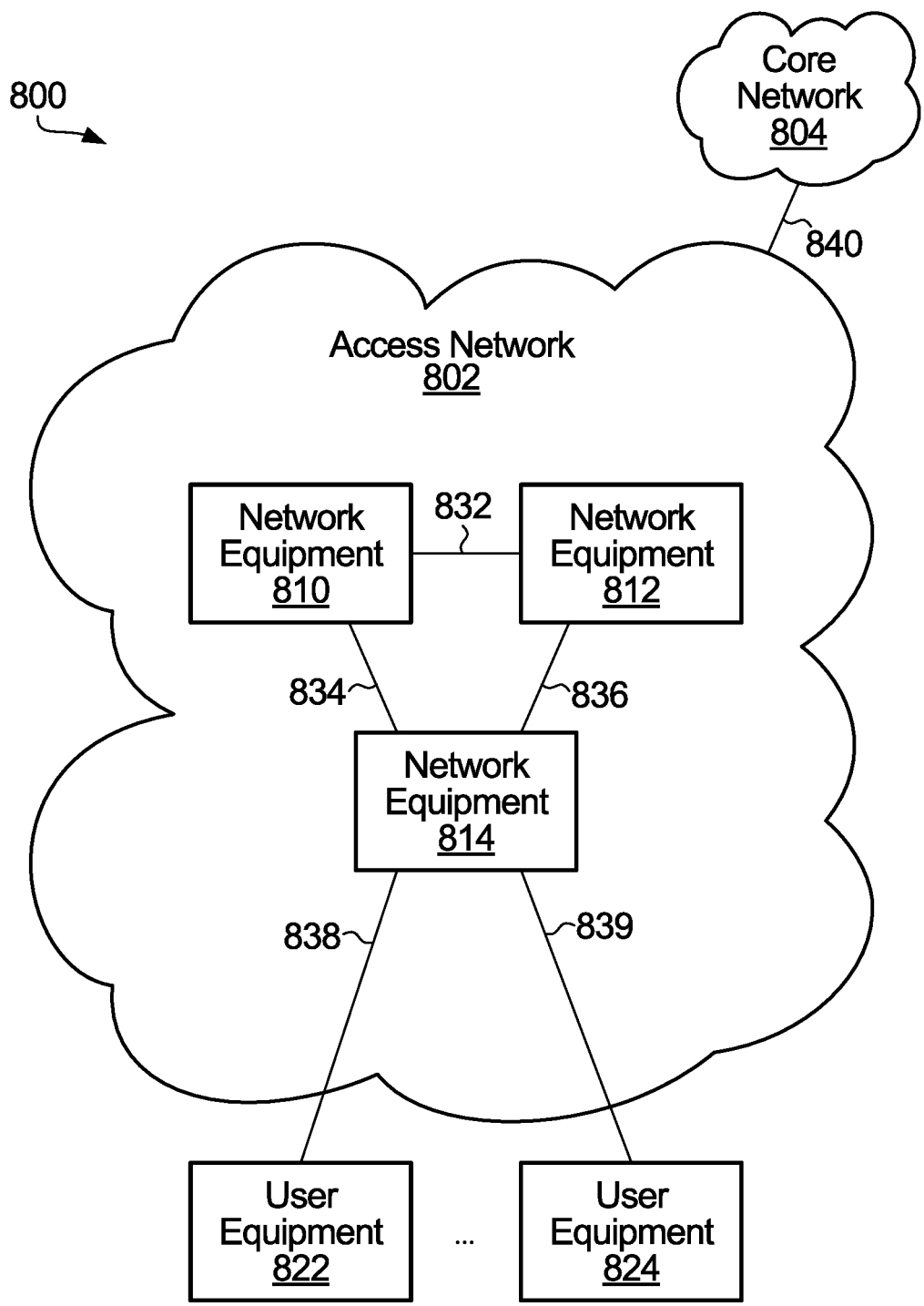
FIG. 8 is a block diagram of an example communication system.

The communication equipment 700 could be user equipment or communication network equipment. FIG. 8 is a block diagram of an example communication system in which embodiments of the present disclosure could be implemented. The example communication system 800 in FIG. 8 includes an access network 802 and a core network 804. The access network 802 includes network equipment 810, 812, 814 which communicates over network communication links 832, 834, 836, and user equipment 822, 824 which communicates with network equipment 814 in the example shown, over access communication links 838, 839. The access network 802 communicates with the core network 804 over another network communication link 840. The core network 804, like the access network 802, may include network equipment that communicates with one or more installations of the network equipment 810, 812, 814 in the access network 802. However, in a communication system with an access network 802 and a core network 804, the core network might not itself directly provide communication service to user equipment.

The communication system 800 is intended solely as an illustrative example. An access network 802 could include more or fewer than three installations of network equipment, for example, which might or might not all directly communicate with each other as shown. Also, more than one installation of network equipment in the access network 802 could provide communication service to user equipment. There could be more than one access network 802 coupled to a core network 804. It should also be appreciated that the present disclosure is not in any way limited to communication systems having an access network/core network structure.

Considering the access network 802, any of various implementations are possible. The exact structure of network equipment 810, 812, 814, and user equipment 822, 824 for which such network equipment provides communication service, is implementation-dependent. The communication equipment 700 in FIG. 7 is an example of communication equipment that could be implemented as the network equipment 810, 812, 814, and/or user equipment 822, 824

At least the network equipment 814 that provides communication service to the user equipment 822, 824 includes a physical interface and communications circuitry to support access-side communications with the user equipment over the access links 838, 839. The access-side physical interface could be in the form of an antenna or an antenna array, for example, where the access communication links 838, 839 are wireless links. In the case of wired access communication links 838, 839, an access-side physical interface could be a port or a connector to a wired communication medium. Multiple access-side interfaces could be provided at the network equipment 814 to support multiple access communication links 838, 839 of the same type or different types, for instance. The type of communications circuitry coupled to the access-side physical interface or interfaces at the access network equipment 814 is dependent upon the type or types of access communication links 838, 839 and the communication protocol or protocols used to communicate with the user equipment 822, 824.

The network equipment 810, 812, 814 also includes a network-side physical interface, or possibly multiple network-side physical interfaces, and communications circuitry to enable communications with other network equipment in the access network 802. At least some installations of network equipment 810, 812, 814 also include one or more network-side physical interfaces and communications circuitry to enable communications with core network equipment over the communication link 840. There could be multiple communication links between network equipment 810, 812, 814 and the core network 804. Network-side communication links 832, 834, 836 in the access network 802, and the communication link 840 to the core network 804, could be the same type of communication link. In this case the same type of physical interface and the same communications circuitry at the network equipment 810, 812, 814 could support communications between access network equipment within the access network 802 and between the access network 802 and the core network 804. Different physical interfaces and communications circuitry could instead be provided at the network equipment 810, 812, 814 for communications within the access network 802 and between the access network 802 and the core network 804.

Network equipment in the core network 804 could be similar in structure to the network equipment 810, 812, 814. However, as noted above, network equipment in the core network 804 might not directly provide communication service to user equipment and therefore might not include access-side physical interfaces for access communication links or associated access-side communications circuitry. Physical interfaces and communications circuitry at network equipment in the core network 804 could support the same type or types of network communication link or links as in the access network 802, different type or types of network communication link or links, or both.

Just as the exact structure of physical interfaces at network equipment 810, 812, 814 and network equipment in the core network 804 is implementation-dependent, the associated communications circuitry is implementation-dependent as well. In general, hardware, firmware, components which execute software, or some combination thereof, might be used in implementing such communications circuitry. Examples of electronic devices that might be suitable for implementing communications circuitry are provided above.

Each installation of user equipment 822, 824 includes a physical interface and communications circuitry compatible with an access-side physical interface and communications circuitry at the network equipment 814, to enable the user equipment to communicate with the network equipment. Multiple physical interfaces of the same or different types could be provided at the user equipment 822, 824. The user equipment 822, 824 could also include such components as input/output devices through which functions of the user equipment are made available to a user. In the case of a wireless communication device such as a smartphone, for example, these functions could include not only communication functions, but other local functions which need not involve communications. Different types of user equipment 822, 824, such as different smartphones for instance, could be serviced by the same network equipment 814.

Any of the communication links 832, 834, 836, 838, 839, 840, and communication links in the core network 804 could potentially be or include wireless communication links. Such communication links tend to be used more often within an access network 802 than in a core network 804, although wireless communication links at the core network level are possible. An antenna array including multiple antenna elements could be used at each end of a wireless communication link to enable communications over the air. In one embodiment, the techniques disclosed herein are used at least for wireless backhaul in the access network 802.

Various embodiments are described by way of example above. More generally, a beamforming tracking apparatus or system includes variable phase shifters 112, 212, 312, 512 to receive signals from respective antenna elements in an antenna array. Each variable phase shifter includes a pair of phase shift elements to apply respective phase shifts relative to a channel phase shift associated with the antenna element from which the variable phase shifter receives signals. The respective phase shifts correspond to side angles in opposite directions from a current antenna beam direction of the antenna array. A beamforming tracking controller 126, 226, 426, 526, 626 is coupled to receive phase shifted signals from the variable phase shifters, and is configured to generate control signals, based on the phase shifted signals, to control the channel phase shifts. Beamforming tracking could be one-dimensional or multi-dimensional.

In an embodiment, the beamforming tracking controller 126, 226, 426, 526, 626 is configured to determine whether a spectrum function has a larger value for the phase shifted signals to which a phase shift corresponding to a first side angle has been applied, or for the phase shifted signals to which a phase shift corresponding to a second side angle has been applied. The control signals are generated based on the determination. Examples of the spectrum function include signal power for power law tracking, and an AoA gradient for AoA gradient tracking.

The control signals control the channel phase shifts to correspond to the current antenna beam direction, adjusted by a tracking angle based on the side angle for which the phase shifted signals have the larger value of the spectrum function.

For one-dimensional beamforming tracking, if the phase shifted signals to which the phase shift corresponding to the first side angle has been applied have the larger value of the spectrum function, then the channel phase shifts are controlled to adjust the antenna beam direction by the tracking angle in the direction of the first side angle. Similarly, if the phase shifted signals to which the phase shift corresponding to the second side angle has been applied have the larger value of the spectrum function, then the channel phase shifts are controlled to adjust the antenna beam direction by the tracking angle in the direction of the second side angle.

In two-dimensional beamforming tracking, there are four directions. Channel phase shifts could be controlled based on an overall highest spectrum function value among all four directions. The tracking angle in the horizontal and vertical gradient power law tracking mechanism described above might not necessarily be in the same direction as one of the side angles, but the tracking angle direction is still based on side angles for which the phase shifted signals have the larger value of the spectrum function, which is signal power in gradient power law tracking.

In FIGS. 1 and 3 to 6, each variable phase shifter includes a variable phase shift element to apply the channel phase shifts, and the pair of phase shift elements are coupled to the variable phase shift element. In FIG. 2, the pair of phase shift elements of each variable phase shifter includes a pair of variable phase shift elements.

LNAs, frequency downconverters, ADCs, and/or a signal combiner may be provided in some embodiments. For example, a first frequency downconverter could be coupled to the tracking controller and to phase shift elements of the variable phase shifters that apply a phase shift corresponding to a first side angle in a first direction, and a second frequency downconverter could be coupled to the tracking controller and to phase shift elements of the variable phase shifters that apply a phase shift corresponding to a second side angle in a second direction, different from the first direction. These are shown by way of example as the side channel or side channel frequency downconverters 114, 118 in FIGS. 1 to 4. A third frequency downconverter such as 116 in FIG. 1 could be coupled to the tracking controller and to the variable phase shifters.

ADCs could be similarly coupled in side channel paths and a main channel path, as shown in FIGS. 1 to 4. An ADC, or a signal combiner in some embodiments, may provide a digital output for processing by a receiver.

Communication equipment could include an antenna array, variable phase shifters, and a beamforming tracking controller. The variable phase shifters and the beamforming tracking controller could implement one-dimensional or multi-dimensional beamforming tracking.

Figure 9:
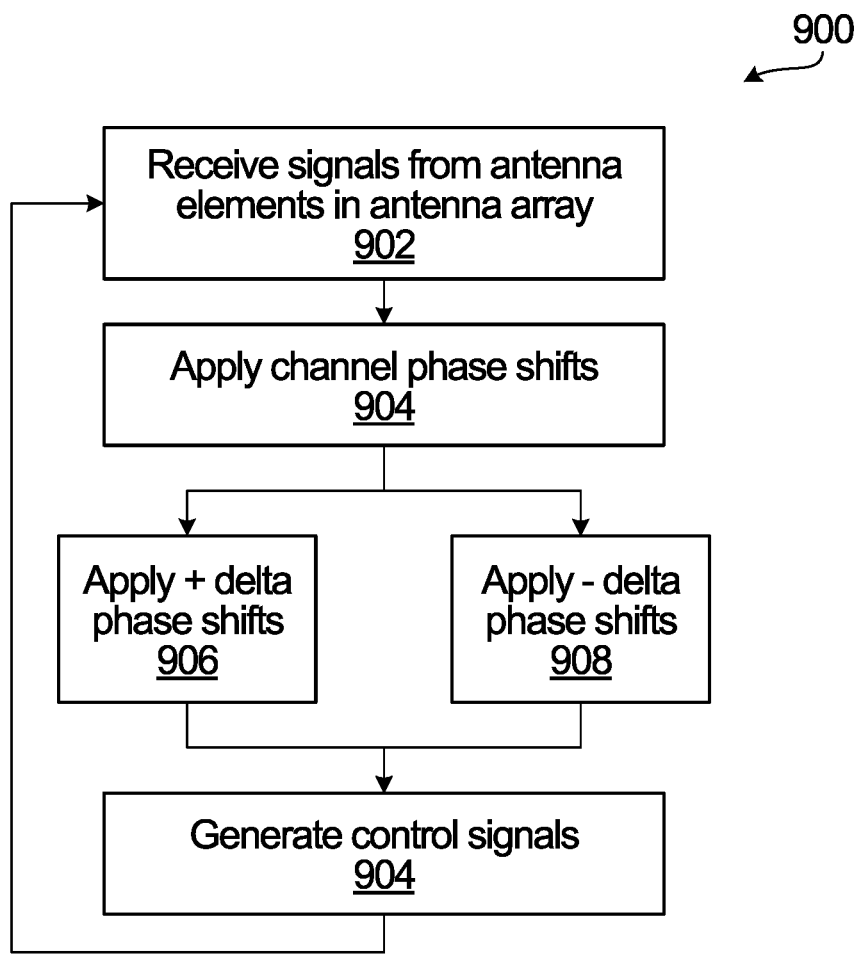
FIG. 9 is a flow diagram illustrating an example beamforming tracking method.

The embodiments described above with reference to FIGS. 1 to 8 relate to apparatus or systems. Methods are also contemplated. FIG. 9 is a flow diagram of an example beamforming tracking method.

At 902, signals are received from antenna elements in an antenna array. Channel phase shifts are applied to the received signals at 904. At 906, 908 respective phase shifts relative to the channel phase shifts are applied to the signals that are received from each of the antenna elements. The "+delta" and "−delta" phase shifts correspond to the +delta and the −delta side angles in opposite directions from a current antenna beam direction of the antenna array for one-dimensional beamforming tracking. For two-dimensional beamforming tracking, there are four phase shifts that respectively correspond to four tracking directions. The phase shifting at 906, 908 are shown in parallel in FIG. 9, to illustrate that the side angle phase shifts are applied at the same time to the same received signals, and not at different times using signals that are received in separate signal scanning time slots, for example.

Control signals based on the phase shifted signals from the phase shifting operations at 906, 908 are generated at 910, to control the channel phase shifts that will be applied to signals which are subsequently received from the antenna elements at 902.

The example method 900 is illustrative of one embodiment. In other embodiments, similar or different operations could be performed in a similar or different order. Various ways to perform the illustrated operations, as well as examples of other operations that may be performed, are described herein.

For example, although separate phase shifting operations are shown at 904 and 906, 908, the channel phase shifts could be performed with the side angle phase shifts, as in the apparatus embodiment in FIG. 2. In the embodiment shown in FIG. 9, the side angle phase shifts are applied at 906, 908 to phase shifted signals to which the channel phase shifts have been applied at 904. Phase shifting could instead involve applying, to the signals that are received from each of the antenna elements at 902, a first phase shift corresponding to the channel phase shift plus a delta phase shift and a second phase shift corresponding to the channel phase shift less a delta phase shift. The delta phase shift could be of the same magnitude for both side angles, as shown in FIGS. 1 to 4, or possibly of different magnitudes in other embodiments.

Generation of the control signals at 910 could involve determining whether a spectrum function, such as signal power or AoA gradient, has a larger value for the phase shifted signals to which a phase shift corresponding to a first side angle has been applied, or for the phase shifted signals to which a phase shift corresponding to a second side angle has been applied. The control signals control the channel phase shifts to correspond to the current antenna beam direction, adjusted by a tracking angle based on the side angle for which the phase shifted signals have the larger value of the spectrum function. One-dimensional beamforming tracking involves two side angles, and two-dimensional beamforming tracking involves four side angles.

For one-dimensional power law tracking, signal power of the phase shifted signals to which phase shifts corresponding to the first side angle has been applied is compared to signal power of the phase shifted signals to which the phase shift corresponding to the second side angle has been applied. As noted above, there could also be a comparison to signal power of main channel signals for the current antenna beam direction. For AoA gradient tracking, comparisons involve an AoA gradient.

Examples of control signal generation for two-dimensional beamforming tracking are described above.

In some embodiments, additional operations could be performed. Phase shifted signals could be frequency downconverted, converted from analog to digital, and/or combined as described above, for example. Some embodiment may also or instead provide multi-dimensional beamforming tracking.

Further variations may be or become apparent, from the apparatus and system drawings and descriptions for instance.

Figure 10:
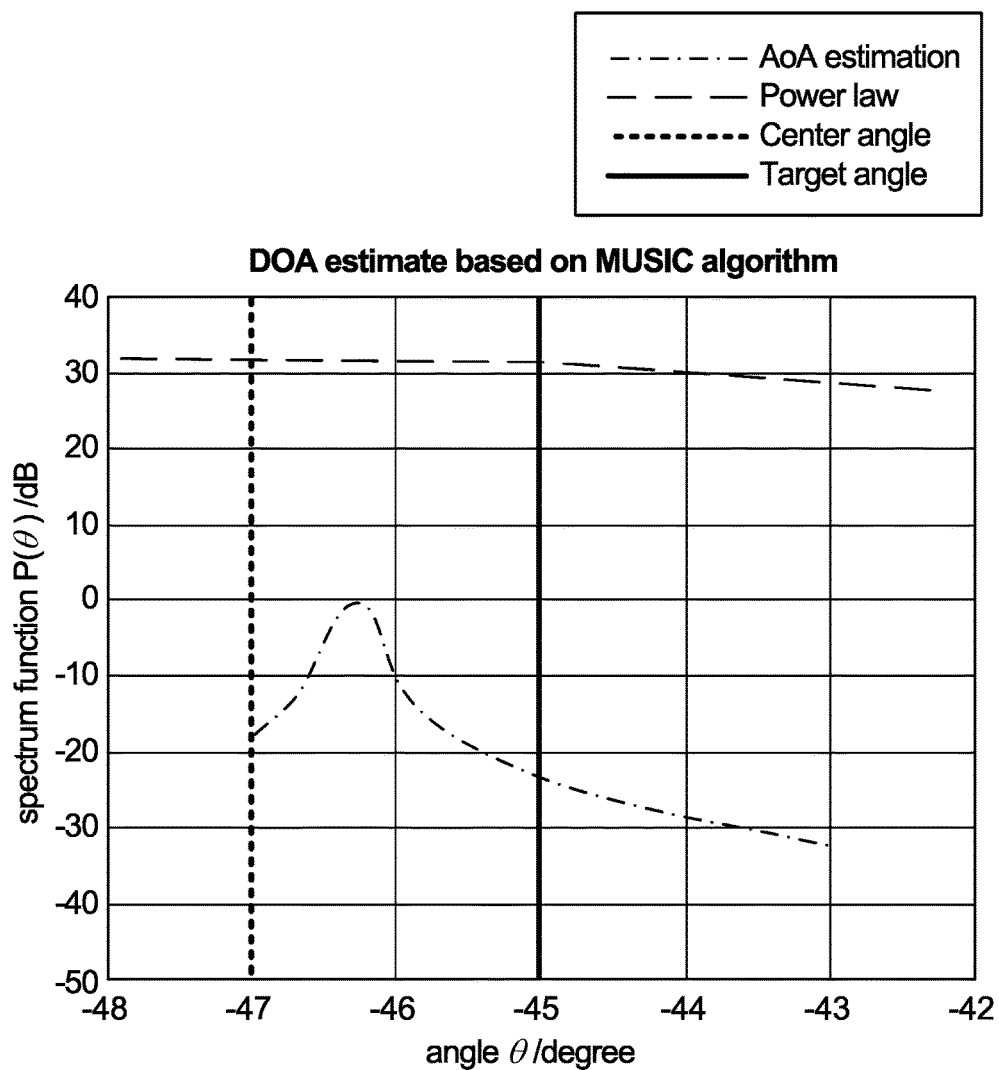
FIG. 10 is a plot of simulation results, and illustrates a spectrum function for an angle of arrival (AoA) gradient method and a power law method.
Figure 11:
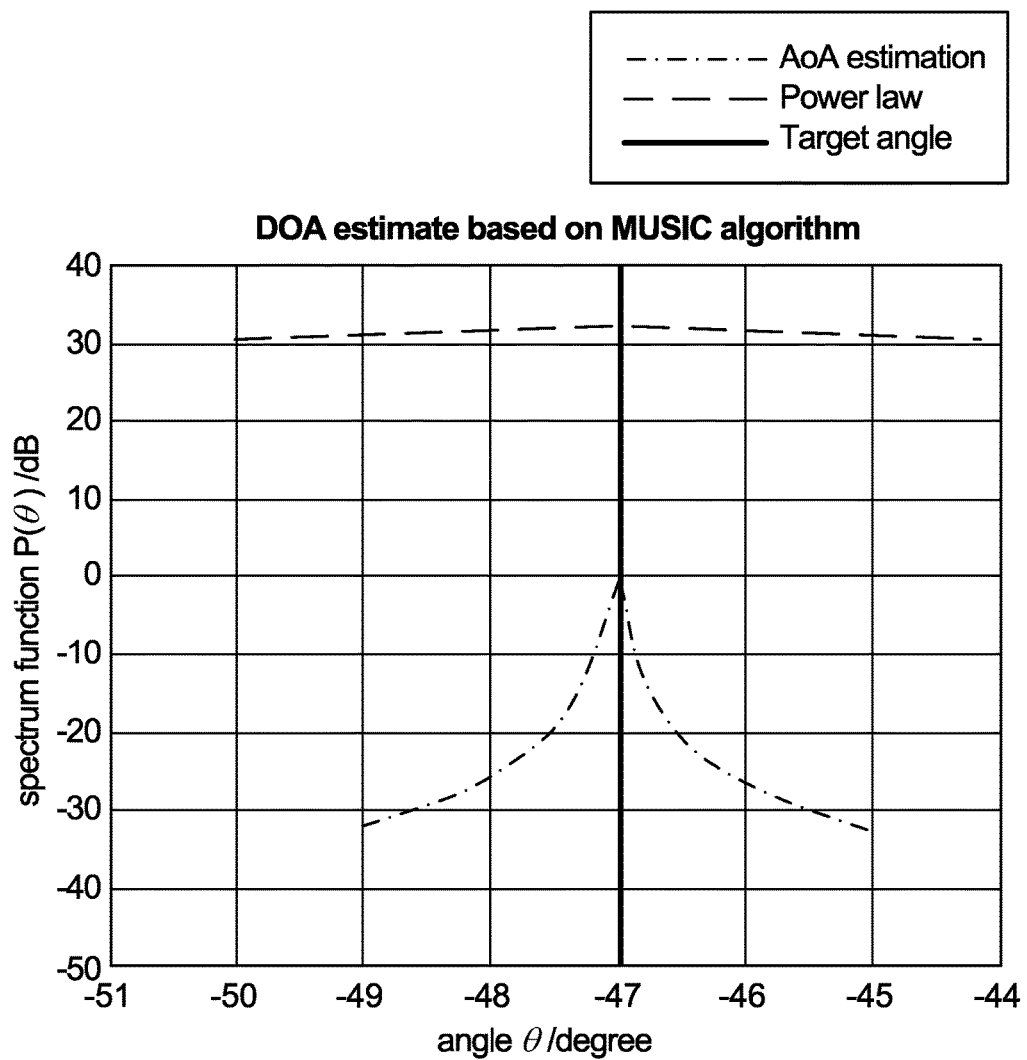
FIG. 11 is another plot of simulation results, and illustrates a spectrum function for the AoA gradient method and the power law method when the antenna beam is aligned with the direction of arrival of a received signal.
Figure 12:
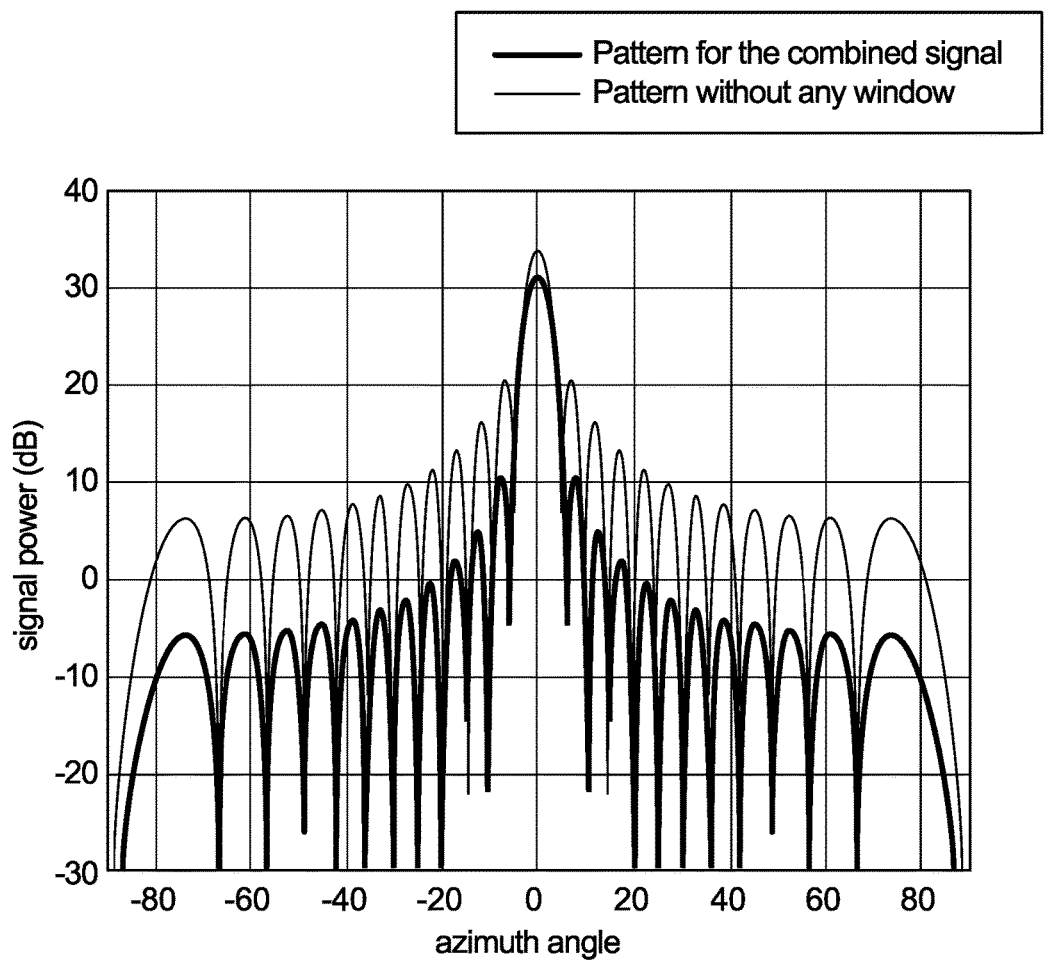
FIG. 12 is a further plot of simulation results, illustrating signal power versus azimuth angle for an antenna pattern based on combining two side signals and an antenna pattern based on main channel paths without signal combining.

FIGS. 10 to 12 are example plots of simulation results. The example plots in FIGS. 10 to 12 relate to a one-dimensional uniform linear array of 24 antenna elements with lambda/2 spacing between adjacent antenna elements. For the simulations, random phase errors, uniform and within 0 to 20 degrees, were added for each RF beamforming branch.

FIG. 10 illustrates a spectrum function for both the AoA gradient method and the power law method, for a current antenna beam pointing angle of −45 degrees and an actual direction of arrival of −47 degrees. The spectrum function for both the AoA gradient method and the power law method would result in realigning the antenna beam to the left in this example, toward the actual direction of arrival.

Regarding the AoA gradient trace, the spectrum function differences are not as pronounced as for the power law trace in the scale shown in FIG. 10. These differences would be more prominent on a different scale that could be used in beamforming tracking based on the AoA gradient method.

For the power law trace, power increases to the left for a side angle of just over 1 degree, and then peaks and starts to decrease. Such characteristics could be determined and taken into account when setting delta/side angles.

FIG. 11 shows the AoA gradient and power law traces for side angles when the antenna beam is aligned with the direction of arrival. In both cases, the spectrum function is at a peak at the direction of arrival.

FIG. 12 illustrates signal power versus azimuth angle, and compares the antenna pattern for combining two side signals and the antenna pattern which uses main channel paths without signal combining. In the example shown, the signal combining or windowing suppresses side lobes. There is some main lobe suppression, by about 3 dB in this example, but side lobe suppression is must more significant, at about 10 dB.

The example plots in FIGS. 10 to 12 are for illustrative purposes only. Different results could be observed under similar or different simulation conditions, and/or during operation.

What has been described is merely illustrative of the application of principles of embodiments of the present disclosure. Other arrangements and methods can be implemented by those skilled in the art. Although the present disclosure refers to specific features and embodiments, various modifications and combinations can be made. The specification and drawings are, accordingly, to be regarded simply as an illustration of embodiments of the invention as defined by the appended claims, and are contemplated to cover any and all modifications, variations, combinations, or equivalents. Thus, it should be understood that various changes, substitutions and alterations can be made herein without departing from the invention as defined by the appended claims.

Moreover, the scope of the present application is not intended to be limited to particular embodiments of any process, machine, manufacture, composition of matter, means, methods and steps described in the specification. As one of ordinary skill in the art will readily appreciate from the present disclosure, processes, machines, manufacture, compositions of matter, means, methods, or steps, presently existing or later to be developed, that perform substantially the same function or achieve substantially the same result as the corresponding embodiments disclosed herein may be utilized. Accordingly, the appended claims are intended to include within their scope such processes, machines, manufacture, compositions of matter, means, methods, or steps.

For example, the drawings show illustrative example embodiments. The techniques disclosed herein are not limited only to such embodiments. Other embodiments could include similar or different components interconnected in a similar or different order. The numbers of components could also or instead vary between different embodiments. A one-dimensional beamforming tracking control system could include multiple pairs of side angle phase shift elements to enable simultaneous scanning of multiple side angles in each direction, for instance.

It should also be appreciated that other implementation details could be different in different embodiments. For example, side angles need not necessarily be symmetric about a current antenna beam direction. A side angle in one direction might be increased, for instance, if the antenna beam has been realigned in that direction (such as right or left) in several tracking cycles. The same or different side angles could similarly be used for scanning in different orientations in two-dimensional beamforming scanning. Although it is expected that all side angles will have a common value in many implementations, in some embodiments different side angles could be used.

Also, although described primarily in the context of methods and systems, other implementations are also contemplated, such as in the form of instructions stored on a non-transitory processor-readable medium, for example. This is illustrative of an embodiment in the form of a software product. More generally, a software product may be stored in a nonvolatile or non-transitory storage medium, which could be implemented in the form of one or more memory devices, including solid-state memory devices and/or memory devices with movable and possibly even removable storage media. Examples of memory devices include a compact disk read-only memory (CD-ROM), Universal Serial Bus (USB) flash disk, and a removable hard disk. A software product includes a number of instructions, stored on the storage medium, that enable a processor or computer device (personal computer, server, network device, for example) to execute methods as disclosed herein.

We claim:

1. An apparatus comprising:
    a plurality of variable phase shifters to receive signals from respective antenna elements in an antenna array, each of the variable phase shifters comprising a pair of phase shift elements to apply respective phase shifts relative to a channel phase shift associated with the antenna element from which the variable phase shifter receives signals, the respective phase shifts corresponding to side angles from a current antenna beam direction of the antenna array; and
    a beamforming tracking controller, coupled to receive phase shifted signals from the variable phase shifters, to generate control signals based on the phase shifted signals to control the channel phase shifts.

2. The apparatus of claim 1,
    wherein each of the variable phase shifters further comprises a variable phase shift element to apply, to received signals, the channel phase shift associated with the antenna element from which the variable phase shifter receives signals,
    wherein the pair of phase shift elements are coupled to the variable phase shift element.

3. The apparatus of claim 1, wherein the pair of phase shift elements of each of the variable phase shifters comprises a pair of variable phase shift elements.

4. The apparatus of claim 1, further comprising:
    a first frequency downconverter coupled to the tracking controller and to phase shift elements of the pairs of phase shift elements of the variable phase shifters that apply a phase shift corresponding to a first side angle in a first direction; and
    a second frequency downconverter coupled to the tracking controller and to phase shift elements of the pairs of phase shift elements of the variable phase shifters that apply a phase shift corresponding to a second side angle in a second direction, different from the first direction.

5. The apparatus of claim 2, further comprising:
    a first frequency downconverter coupled to the tracking controller and to phase shift elements of the pairs of phase shift elements of the variable phase shifters that apply a phase shift corresponding to a first side angle in a first direction; and
    a second frequency downconverter coupled to the tracking controller and to phase shift elements of the pairs of phase shift elements of the variable phase shifters that apply a phase shift corresponding to a second side angle in a second direction, different from the first direction; and
    a third frequency downconverter coupled to the tracking controller and to the variable phase shift elements of the variable phase shifters.

6. The apparatus of claim 1, further comprising:
    a first analog to digital converter coupled to the tracking controller and to phase shift elements of the pairs of phase shift elements of the variable phase shifters that apply a phase shift corresponding to a first side angle in a first direction; and
    a second analog to digital converter coupled to the tracking controller and to phase shift elements of the pairs of phase shift elements of the variable phase shifters that apply a phase shift corresponding to a second side angle in a second direction, different from the first direction.

7. The apparatus of claim 6, further comprising:
    a signal combiner, coupled to the first analog to digital converter and to the second analog to digital converter, to combine digital signals that are generated by the first analog to digital converter and the second analog to digital converter.

8. The apparatus of claim 1, further comprising:
    an analog to digital converter coupled to the variable phase shifters, to provide a digital output for processing by a receiver.

9. The apparatus of claim 1, wherein the pair of phase shift elements is a first pair of phase shift elements, and wherein each of the variable phase shifters further comprises:
    a second pair of phase shift elements to apply respective second phase shifts relative to the channel phase shift associated with the antenna element from which the variable phase shifter receives signals, the respective second phase shifts corresponding to further side angles from the current antenna beam direction of the antenna array.

10. Communication equipment comprising:
    an antenna array comprising a plurality of antenna elements;
    a plurality of variable phase shifters to receive signals from respective antenna elements in an antenna array, each of the variable phase shifters comprising a pair of phase shift elements to apply respective phase shifts relative to a channel phase shift associated with the antenna element from which the variable phase shifter receives signals, the respective phase shifts corresponding to side angles from a current antenna beam direction of the antenna array; and
    a beamforming tracking controller, coupled to receive phase shifted signals from the variable phase shifters, to generate control signals based on the phase shifted signals to control the channel phase shifts.

11. The communication equipment of claim 10, comprising user equipment.

12. The communication equipment of claim 10, comprising communication network equipment.

13. The communication equipment of claim 10, further comprising:
    a receiver coupled to the plurality of variable phase shifters.

14. The communication equipment of claim 10, further comprising:
    a transceiver coupled to the plurality of variable phase shifters.

15. A method comprising:
    receiving signals from antenna elements in an antenna array,
    applying, to the signals received from each of the antenna elements, respective phase shifts relative to a channel phase shift associated with the antenna element from which the signals are received, the respective phase shifts corresponding to side angles from a current antenna beam direction of the antenna array; and
    generating control signals based on phase shifted signals to control the channel phase shifts associated with the antenna elements.

16. The method of claim 15, wherein the generating comprises:
- determining whether a spectrum function has a larger value for the phase shifted signals to which a phase shift corresponding to a first side angle has been applied, or for the phase shifted signals to which a phase shift corresponding to a second side angle has been applied; and
- generating the control signals to control the channel phase shifts to correspond to the current antenna beam direction adjusted by a tracking angle based on the one of the first side angle and the second side angle for which the phase shifted signals have the larger value of the spectrum function.

17. The method of claim 16, wherein the spectrum function comprises signal power.

18. The method of claim 16, wherein the spectrum function comprises an angle of arrival gradient.

19. The method of claim 15, wherein applying comprises:
- applying, to the signals received from each of the antenna elements, the channel phase shift associated with the antenna element from which the signals are received, and
- applying, to phase shifted signals to which the channel phase shifts have been applied, the respective phase shifts.

20. The method of claim 15, wherein applying comprises:
- applying, to the signals received from each of the antenna elements, a first phase shift corresponding to the channel phase shift associated with the antenna element from which the signals are received, plus a delta phase shift corresponding to a first side angle in a first direction, and
- applying, to the signals received from each of the antenna elements, a second phase shift corresponding to the channel phase shift associated with the antenna element from which the signals are received, less a delta phase shift corresponding to a second side angle in a second direction different from the first direction.

21. The method of claim 15, further comprising:
- frequency downconverting phase shifted signals to which a phase shift corresponding to a first side angle in a first direction has been applied; and
- frequency downconverting phase shifted signals to which a phase shift corresponding to a second side angle in a second direction, different from the first direction, has been applied.

22. The method of claim 19, further comprising:
- frequency downconverting phase shifted signals to which a phase shift corresponding to a first side angle in a first direction has been applied; and
- frequency downconverting phase shifted signals to which a phase shift corresponding to a second side angle in a second direction, different from the first direction, has been applied; and
- frequency downconverting phase shifted signals to which the channel phase shifts have been applied.

23. The method of claim 15, further comprising:
- converting phase shifted signals, to which a phase shift corresponding to a first side angle in a first direction has been applied, from analog to digital; and
- converting phase shifted signals, to which a phase shift corresponding to a second side angle in a second direction different from the first direction has been applied, from analog to digital.

24. The method of claim 23, further comprising:
- combining digital signals that are generated by converting the phase shifted signals from analog to digital.

25. The method of claim 15, further comprising:
- converting the phase shifted signals to which the respective phase shifts have been applied, from analog to digital to provide a digital output for processing by a receiver.

26. The method of claim 15, wherein the phase shifts are first phase shifts, the method further comprising:
- applying, to the signals received from each of the antenna elements, respective second phase shifts relative to the channel phase shift associated with the antenna element, the respective second phase shifts corresponding to further side angles from the current antenna beam direction of the antenna array.

27. The method of claim 15, implemented at user equipment.

28. The method of claim 15, implemented at communication network equipment.

29. A non-transitory processor-readable medium storing instructions which, when executed by one or more processors, cause the one or more processors to perform a method comprising:
- receiving phase shifted signals, the phase shifted signals comprising signals received at antenna elements in an antenna array and phase shifted by respective phase shifts relative to a channel phase shift associated with the antenna element at which the signals are received, the respective phase shifts corresponding to side angles from a current antenna beam direction of the antenna array; and
- generating control signals based on phase shifted signals to control the channel phase shifts associated with the antenna elements.

* * * * *